United States Patent
Glucksman et al.

(10) Patent No.: US 6,572,036 B2
(45) Date of Patent: Jun. 3, 2003

(54) COFFEE GRINDER WITH STORAGE AND DISPENSING MEANS

(75) Inventors: Dov Z. Glucksman, Wenham, MA (US); Samuel T. Kjellman, Henniker, NH (US); Constantine Pezaris, Nahant, MA (US)

(73) Assignee: Appliance Development Corporation, Danvers, MA (US)

( * ) Notice: Subject to any disclaimer, the term of this patent is extended or adjusted under 35 U.S.C. 154(b) by 0 days.

(21) Appl. No.: 09/838,879

(22) Filed: Apr. 20, 2001

(65) Prior Publication Data

US 2002/0153438 A1 Oct. 24, 2002

(51) Int. Cl.⁷ .......................... B02C 19/12; B02C 25/00
(52) U.S. Cl. .................... 241/27; 241/33; 241/36; 241/100
(58) Field of Search .................... 241/33, 34, 35, 241/36, 100, 27, 30

(56) References Cited

U.S. PATENT DOCUMENTS

| | | | |
|---|---|---|---|
| 2,560,826 A | 7/1951 | Schuhmnn | 241/63 |
| 3,247,778 A | 4/1966 | Davis | 241/63 |
| 3,327,615 A | 6/1967 | Swan | 241/63 |
| 4,645,132 A | 2/1987 | Fregnan | 241/30 |
| D295,360 S | 4/1988 | Pandolfi | D7/373 |
| 4,789,106 A | 12/1988 | Weber | 241/101.2 |
| 4,858,522 A | 8/1989 | Castelli | 99/280 |
| 4,936,515 A | 6/1990 | Poag et al. | 241/36 |
| 4,971,259 A | 11/1990 | Nidiffer | 241/34 |
| 5,186,399 A * | 2/1993 | Knepler et al. | 241/34 |
| RE34,382 E | 9/1993 | Newnan | 222/307 |
| 5,386,944 A * | 2/1995 | Knepler et al. | 241/135 |
| D361,919 S | 9/1995 | Fouquet | D7/373 |
| 5,462,236 A | 10/1995 | Knepler | 241/34 |
| 5,522,556 A * | 6/1996 | Knepler et al. | 241/135 |
| 5,542,342 A | 8/1996 | McNeill et al. | 99/280 |
| 5,558,283 A | 9/1996 | Fisher et al. | 241/100 |
| 5,603,458 A | 2/1997 | Sandolo | 241/34 |
| 5,671,657 A | 9/1997 | Ford et al. | 99/286 |
| 5,690,283 A | 11/1997 | Sandolo | 241/34 |
| D389,010 S | 1/1998 | Joergensen | D7/373 |
| 5,718,163 A | 2/1998 | Termini | 99/286 |

* cited by examiner

Primary Examiner—John M. Husar
(74) Attorney, Agent, or Firm—George A. Herbster

(57) ABSTRACT

A coffee grinder with a removable storage and dispensing element that has a housing and rotatable assembly in the housing. The rotatable assembly includes a distributor allows a single one of multiple open sectors to be filled in any given position. A dispensing component has an open sector angularly offset from the open sector of the distributor. When the dispensing component open sector aligns with a filled sector, the beans drop into a hopper for grinding. A grinder operates until all the beans in the hopper are ground.

14 Claims, 10 Drawing Sheets

COFFEE GRINDER WITH STORAGE AND DISPENSING MEANS

BACKGROUND OF THE INVENTION

1. Field of the Invention

This invention generally relates to grinders for coffee beans and the like. More specifically, this invention provides a coffee grinder with storage for and the dispensing of a fixed volume of whole coffee beans for grinding.

2. Description of Related Art

Many individuals prefer to brew coffee with freshly ground coffee beans. Two general types of coffee grinders are available for performing this function, namely: chopper and burr grinders. The burr grinder is preferred because it allows an individual to select a grind size more accurately than can be achieved with a chopper.

As known, if coffee beans are stored in a coffee grinder for long periods of time, the coffee can be less tasty and eventually the coffee beans may become rancid. Consequently, it is generally accepted that such beans should be kept in a tight container. It is also desirable that the tight container be opaque or that the beans be stored in a dark area and/or stored in a refrigerator or freezer.

Storage containers used with conventional burr grinders are generally integral with the burr grinder. They can not be detached. Consequently they provide only a limited storage capacity to prevent the bean quality from deteriorating. It is impossible to seal these storage containers or remove them from the coffee grinder for storage in a refrigerator or other area.

Oftentimes individuals may wish to grind different types of coffee, such as caffeinated and decaffeinated coffees at different times. When the storage container is integral with the grinder, it is necessary to empty the grinder completely of one type of bean and then add new beans of another type. Any beans that are trapped between the storage container and the grinder from the prior coffee selection are included in the new coffee grind.

In many burr grinders a hopper is filled with coffee beans that are continuously admitted to the grinding mechanism, so there must be some way to meter or limit the amount of beans that are actually ground for a given brewing session. Prior burr grinders include an adjustment mechanism that establishes a desired quantity of ground coffee by setting a grinding time. This assumes that grinding time and the volume or weight of the ground coffee correlate accurately. In fact, that correlation is not always accurate. Moreover, when the grinding stops, whole and partial coffee beans remain in the unit. It is possible for the quality of those beans to deteriorate.

Various grinder functions in a grinder with an integral storage container are disclosed in U.S. Pat. No. 4,858,522 (1989) to Castelli for an automatic espresso coffee making machine for household use. The disclosed coffee making machine incorporates an electronic device linked operatively to a timer and a selector operative to dispense one or two doses of espresso coffee. Grinding is for one of two fixed time intervals depending upon whether a single or double dose of coffee is being prepared. After grinding, the ground coffee falls onto a chute into a percolation chamber where it is brewed.

As will be apparent, this particular patent includes an integral storage container and a timer for controlling the amount of coffee that is ground. It is therefore subject to inaccuracies in the volume of coffee that is actually ground. It does not include a removable unit that can combine storage and dispensing functions and does not provide for a proper storage environment for long term storage.

SUMMARY

An object of this invention is to provide a coffee grinder with storage and dispensing functions that enable more accurate control of the amount of coffee that is actually ground.

A coffee grinder in accordance with this invention includes grinding heads and a motor. A storage dispensing element premeasures a volume of coffee beans for brewing a desired number of cups of coffee. This volume transfers to the grinder heads. Grinding occurs by initiating the operation of the grinder motor and sensing the level of the grinder motor. Grinding continues while the sense motor load is above a predetermined level.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
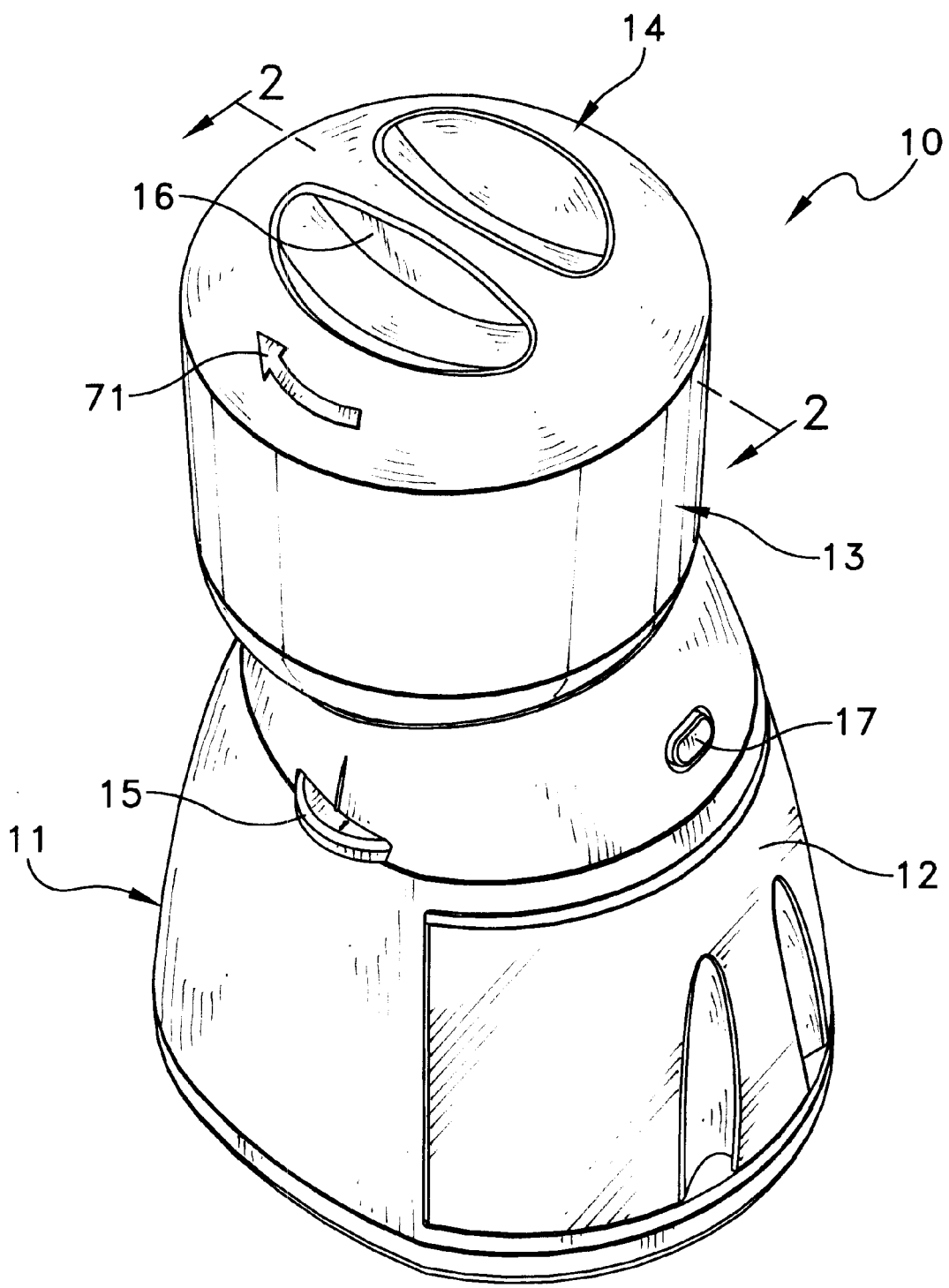
FIG. 1 is a perspective view of a coffee grinder constructed in accordance with this invention.
Figure 2:
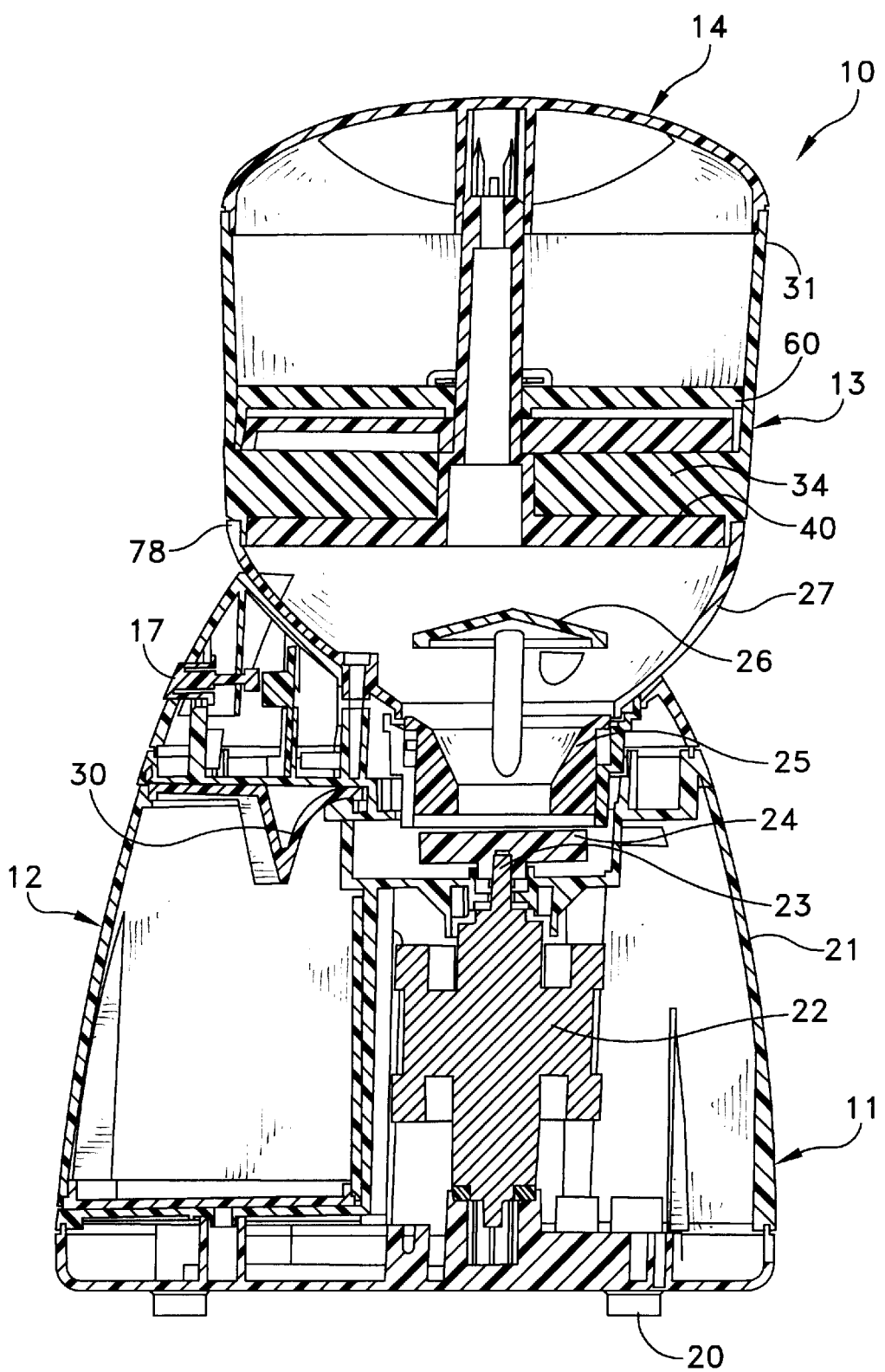
FIG. 2 is a cross-section taken along lines 2—2 in FIG. 1.

FIGS. 1 and 2 depict a burr grinder 10 that incorporates this invention. The burr grinder 10 includes a base 11, a removable, ground coffee container 12, a storage and dispensing element 13 and a removable cover 14. In use, an individual removes the cover 14 to load coffee into the storage and dispensing element 13 that has a capacity for storing a significant quantity of coffee beans, as for example one pound. Then a grind size control knob 15 is adjusted to select the fineness of the ground coffee that will accumulate in the container 12. Next the cover 14 is rotated by means of a finger grip 16 through a series of discrete positions. As the cover moves from one position to another, the storage and dispensing element 13 dispenses a predetermined volume of coffee beans into the base 11. When a switch 17 is then activated, the grinding operation begins and continues until all the dispensed whole coffee beans have been ground whereupon the grinder automatically stops.

Although the specific structure of a burr grinder forms no part of this invention, a basic of understanding of one specific embodiment will facilitate an appreciation of this invention and its implementation. FIG. 2 therefore discloses a burr grinder 10 in which the base 11 includes supports 20 for carrying the burr grinder on a flat surface. A housing 21 has a cavity for receiving the ground coffee receptacle 12 and a structure for supporting a motor 22 with a vertical shaft 23 that drives a bottom burr grinder head 24. When the motor 22 is energized, the bottom burr grinder head 24 grinds beans against a stationary top burr grinder head 25. An adjustment wheel 26 controls the size of the ground coffee by lifting or lowering the top burr grinder head 25 with respect to the bottom burr grinder head 24. Although not shown, there is a linkage between the ground size control knob 15 and the adjustment wheel 26. In this particular embodiment the top of the adjustment wheel 26 also diverts beans into the sides of a hopper 27 thereby to provide an efficient feed into the periphery of the grinding heads 24 and 25. The ground coffee discharges through a chute 30 into the container 12.

Figure 3:
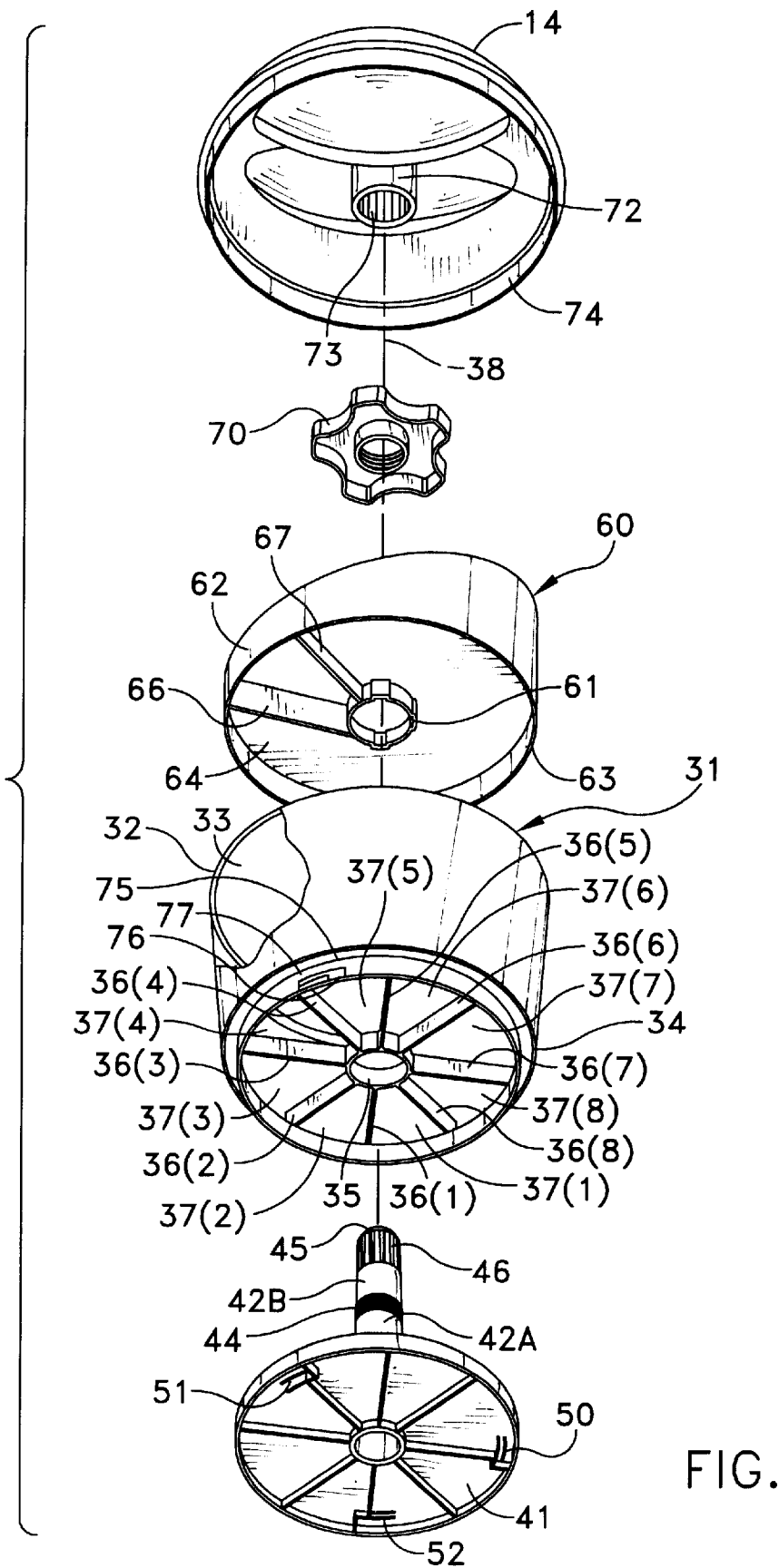
FIG. 3 is an exploded view of a combined storage and dispensing component constructed in accordance with this invention.

Referring to FIGS. 2 and 3, the storage and dispensing element 13 comprises several components including a housing 31 with an upper lip 32 for receiving the cover 14 overlying an open end 33. A base unit 34 at the end of the housing 31 opposite from the opening 33 provides an open sector construction. Specifically, the base unit 34 includes a central annular hub 35 and a plurality of equally spaced radial spokes 36 that extend from the central annular hub 35 to the periphery of the housing 31. Any number of spokes could be used. In this particular embodiment, eight spokes are disclosed and designated 36(1) through 36(8) respectively. Thus the spokes are equiangularly spaced at 45° from adjacent spokes.

The spokes 36 and the periphery of the housing 31 define a series of open sectors or passages 37(1) through 37(8). The depth of each spoke 36 along an axis 38 through the hub 35 and the cylinder 31 is selected so that the volume for each open sector defined by the adjacent spokes 37, such as spokes 37(1) and 37(2), corresponds to a predetermined volume and weight of coffee beans. Coffee beans on average have a constant density, so there is a close correlation between the volume of beans that are ground and the weight of the ground coffee. In this particular embodiment it is assumed an individual sector volume corresponds to a bean ground weight of 6 grams that is the coffee normally used to brew two cups of coffee.

A dispensing component 40 has a plate 41 that underlies the bottom of the radial spokes 37 and has a shaft 42 that extends along the axis 38 centrally from the plate 41. The shaft 42 includes a shoulder portion 43 that is axially coextensive with the hub 35 so that the shoulder 43 acts as a bearing and the hub 35 acts as a journal.

A plurality of integrally molded, axially extending keys 44 extend a fixed distance from the shoulder 43. A shaft portion 42A extends from the keys 44 to a threaded portion 45. Another shaft section 42B extends to a reduced diameter end portion 46 characterized by a plurality of axially extending splines 47.

Figure 4:
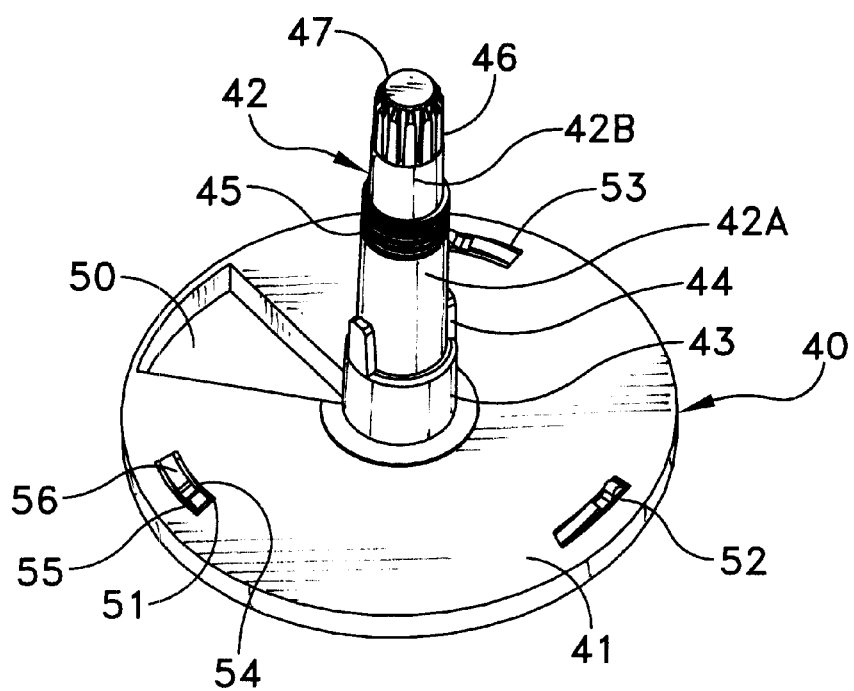
FIG. 4 is an alternate perspective view of a dispensing component shown in FIG. 3.

Referring to FIGS. 3 and 4, the dispensing component 40 includes an open sector 50 through the plate 41 at one location. The open sector 50 corresponds in form to the form of each of the sectors 37. The plate 41 also carries a plurality of detent structures 51, 52 and 53. Referring to the detent structure 51, by way of example, a cross slot 54 aligns with one of the radial spokes 36 when the open sector 50 lies directly under one of the open sectors 37. The detent itself is formed by a u-shaped slot 55 in the plate 41 that defines a tongue 56 that carries the cross slot 54. The three detents 51, 52 and 53 define a positive angular displacement of one open sector.

Figure 5:
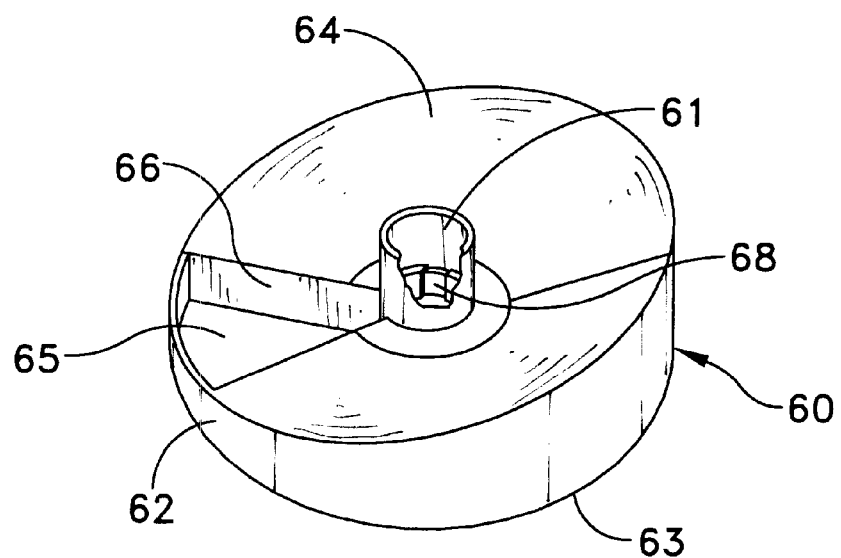
FIG. 5 is an alternate perspective view of a distributor shown in FIG. 3.

The dispensing component 40 attaches to the housing 31 by inserting the shaft 42 through the hub 35. The shaft 42 then receives a distributor 60. Referring to FIGS. 3 and 5, the distributor 60 includes a central hub 61 and a cylindrical body 62 having a bottom edge 63 that lies in a plane transverse to the axis 38. The other end of the body 62 is cut on a bias such that a plate 64 is oblique to the axis 38. The plate 64 includes an open sector 65 that corresponds to the geometry of each of the open sectors 37. A lead sweeper 66 and a trailing sweeper 67, that are radially and axially extensions from the plate 64, bound the two radially extending sides of the open sector 65. The lead sweep 66 has an axial depth that terminates proximate a plane through the top of the radial spokes 36. The trailing sweep 67 ends in an edge that is parallel to but slightly spaced from the top plane of the radial spokes 36. The spacing is selected to be approximately the minimum dimension across a coffee bean.

The hub 61 includes a pattern of keyways 68 that match the pattern of the keys 44. When the distributor plate 60 is positioned on the shaft 42 and engages the keys 44, the open sector 65 is offset from the open sector 50 angularly by one sector position.

After the distributor plate 60 mounts to the shaft 42, a knurled knob 70 is positioned on the shaft 42 and is threaded onto the threaded portion 45. The positions of the threaded portion 45 and the length of the shaft section 42A are selected so that when the knurled knob 70 tightens the structure together it forces the dispensing component 40 and distributor 60 together until the ends of the keys 44 abut the ends of the keyways 68. This produces a spacing that allows the shaft 42 to turn in the hub 35 and for the detents 51, 52 and 53 to interact with the spokes 36. The use of the knurled knob 70 facilitates cleaning of the storage and dispensing element 13 because each of the housing 31, the dispensing component 40 and the distributor 60 can be easily separated for washing by hand or in a dishwasher.

Referring to FIGS. 1 and 3, the cover 14 is a concave structure. In this particular embodiment the cover 14 has an exterior surface including an arrow 71 indicating a direction of rotation. The cover 14 also has an internal axially extending hub 72 with internal splines 73 that match the splines 47. The cover 14 terminates in a peripheral lip 74 that lies inside the lip 32 so that the cover 14 closes the opening 33 and can rotate within the housing 31. By virtue of the interconnection between the hub 72 and the end portion 46, the cover 14 then rotates the dispensing component 40 and the distributor 60 relative to the housing 31.

Referring again to the housing 31, a base periphery 34 additionally includes one or more keyways 75 with an entranceway 76 and an offset circumferential keyway 77. An upper lip 78 shown in FIG. 2 of the hopper 27 includes a corresponding key. In this embodiment, the key is a circumferentially extending rectangular key having a length corresponding to the circumferential opening of the entranceway 76 and an axial dimension corresponding to the axial opening through the extended offset keyway 77. When the assembled storage and dispensing element 13 is inserted into the hopper 27 it is positioned to align the key with the entranceway 76. Any subsequent rotation of the cover 14 rotates the housing 31 until the key seats in the extended keyway 77. Thereafter continued rotation of the cover 14 rotates the shaft 42 with the dispensing component 40 and distributor 60.

Figure 6:
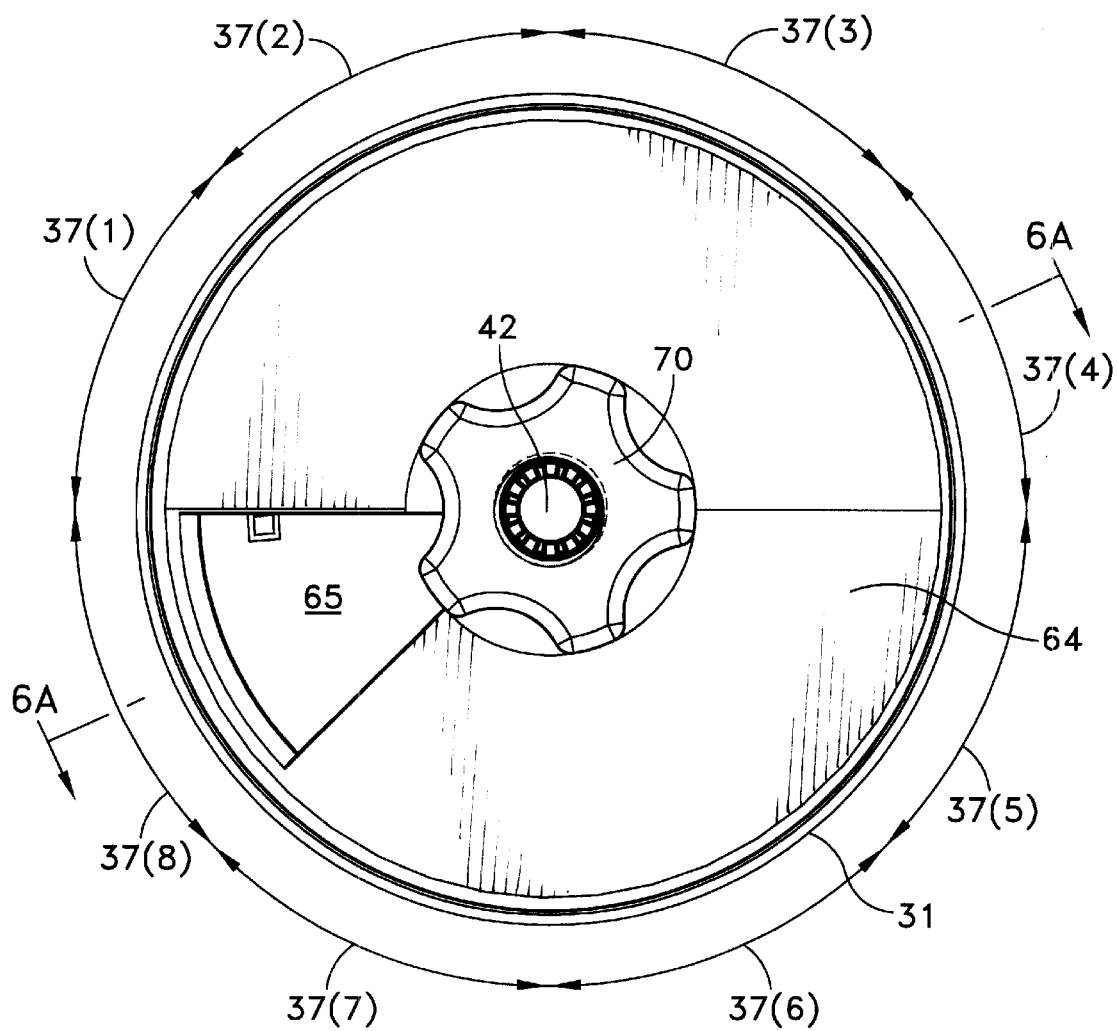
FIGS. 6 and 6A through 6D depict the operation of the dispensing and storage unit of FIG. 3.

FIG. 6 is a top plan view of the storage and dispensing element 13 without the cover 14 so the edge of the housing 31, the plate 64 and the knob 70 are visible. The outer circular reference lines establish the extents of the open sectors 37(1) through 37(8). The section line 6A—6A establishes the view of FIGS. 6A through 6D that represent the relative positions of the dispensing component 40 and the distributor 60 while the shaft 42 rotates through three successive discrete angular displacements. If each sector 37(1) through 37(8) stores beans for two cups of coffee, the sequence shown in FIGS. 6A through 6D dispenses beans for six cups of coffee.

Figure 6A:
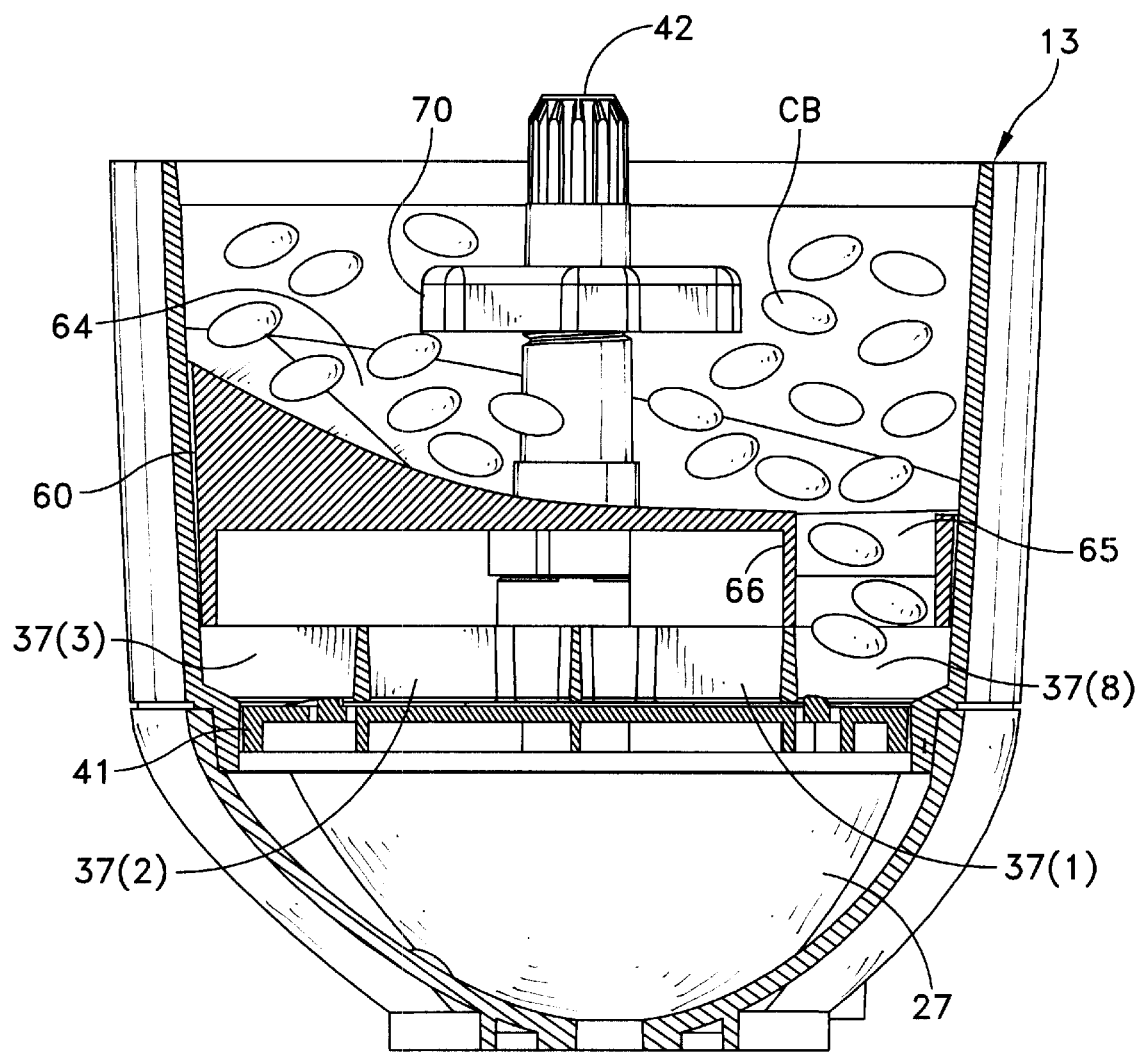

FIG. 6A depicts an initial position prior to any dispensing operation with a full supply of coffee beans CB above the distributor 60. In this position, the hopper 27 is empty. From FIG. 6, the open sector 65 lies above the open sector 37(8) and the open sector 50 lies under the open section 37(7) (not shown). Consequently coffee beans in the storage and dispensing element 13 above the distributor 60 drop through the open sector 65 into the sector 37(8). In this position the lead sweeper 66 blocks any beans from transferring into the sector 37(1).

Figure 6B:
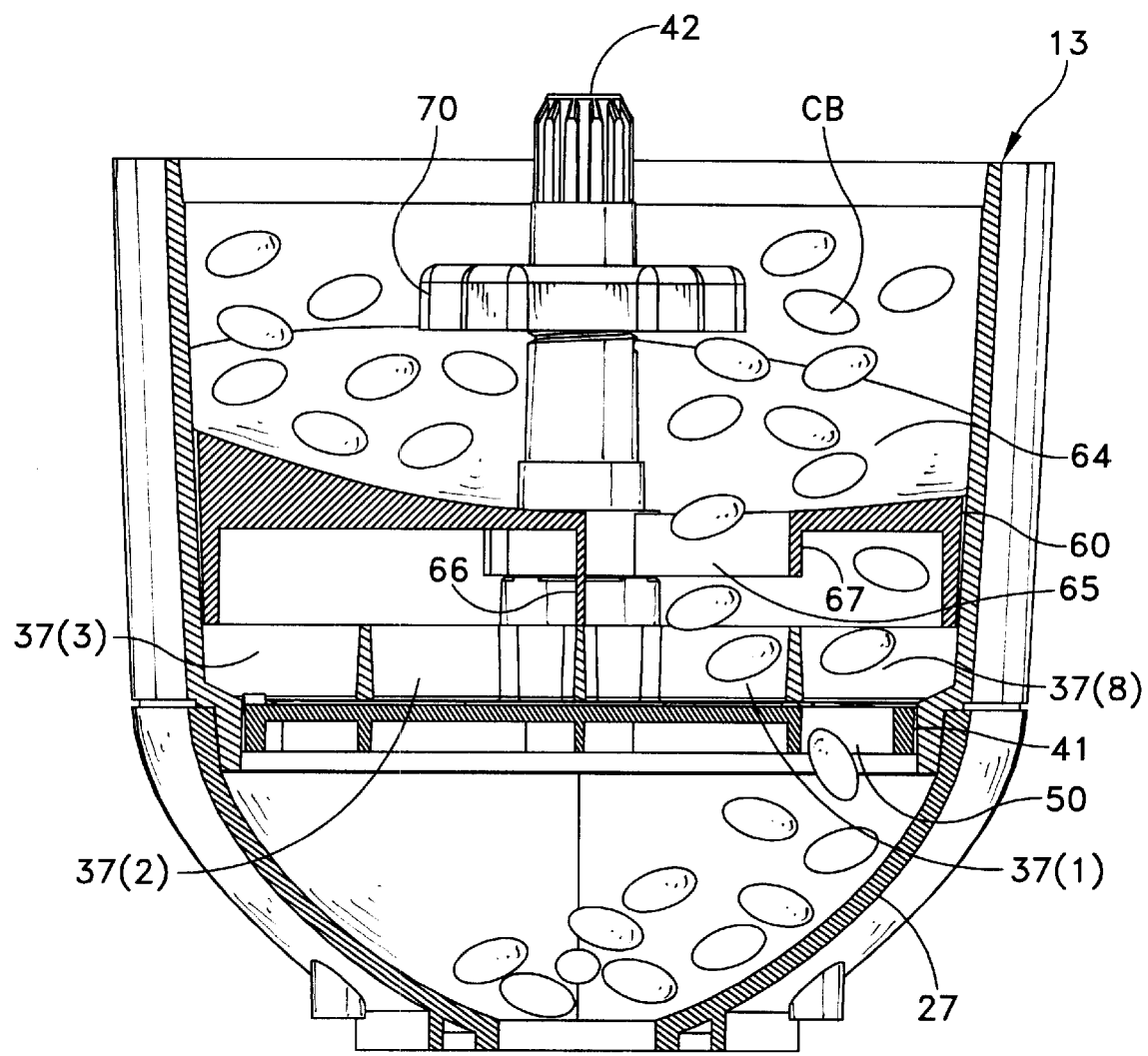

When an individual rotates the cover 14 in the direction of the arrow 71, the detents 51, 51 and 53 release from the corresponding spokes and the cover 14 rotates until these detents contact the next spokes 36 with the open sector 65 overlying the open sector 37(1). In this position, as shown in FIG. 6B, the open sector 50 in the dispensing component 40 allows coffee beans in the sector 37(8) to drop into the hopper 27. The open sector 65 overlies the sector 37(1) so coffee beans drop into the sector 37(1). In this position the trailing sweeper 67 is shown as being spaced slightly from the top of the spokes 36 and that the entire volume from above the plate 41 fills with coffee beans. As the coffee beans drop into the sector (37), the level of coffee beans in the storage and dispensing unit 13 above the distributor 60 drops. In FIG. 6B the hopper 27 contains sufficient beans to brew two cups of coffee.

Figure 6C:
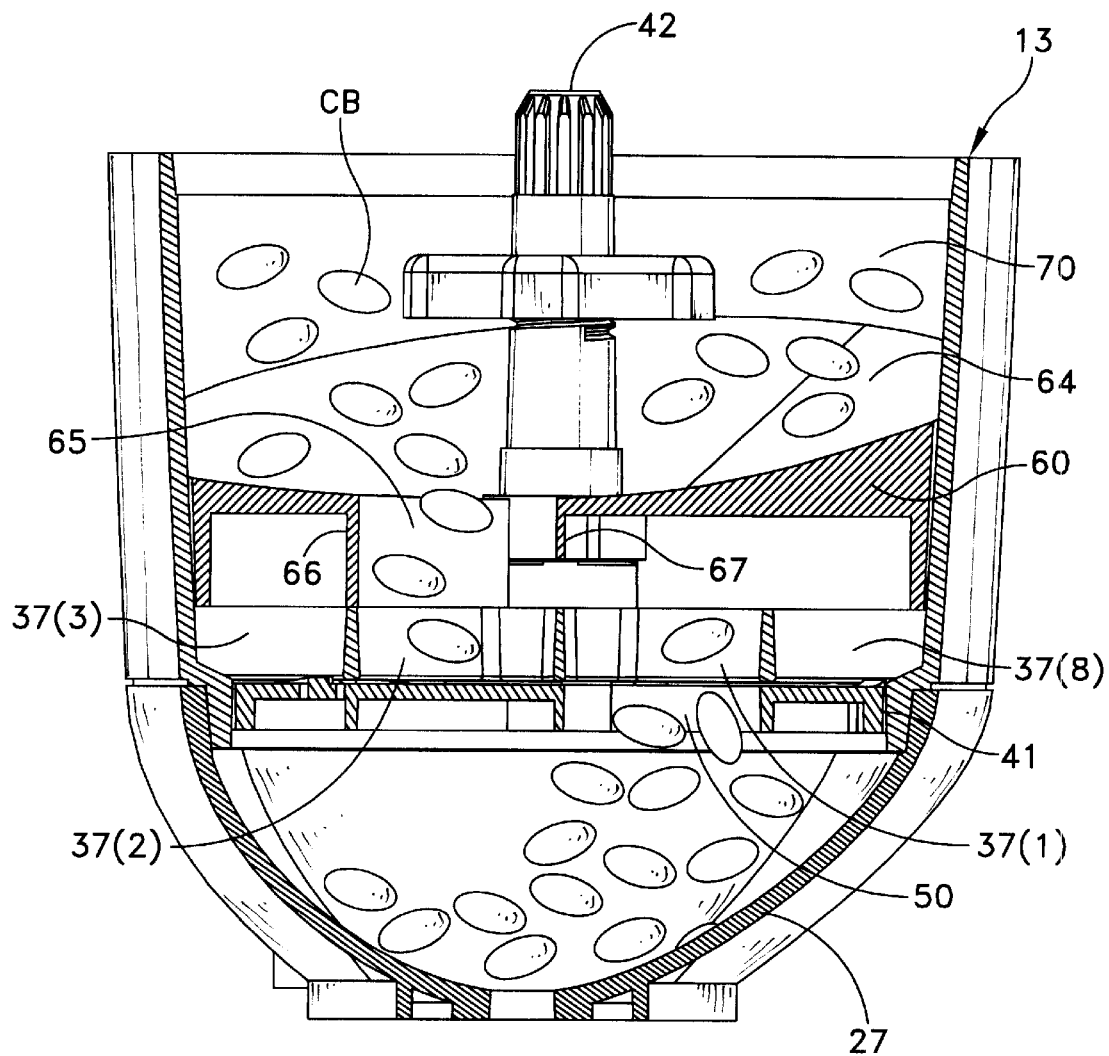

As an individual again turns the cover 14 so the detents 51, 52 and 53 release and then reengage after the predetermined rotation, the sector opening 50 moves into position below the open sector 37(1) as shown in FIG. 6C so those coffee beans drop into the hopper 27 to accumulate with the previously dispensed coffee beans. In this position the open sector 65 allows the sector 37(2) to fill.

Figure 6D:
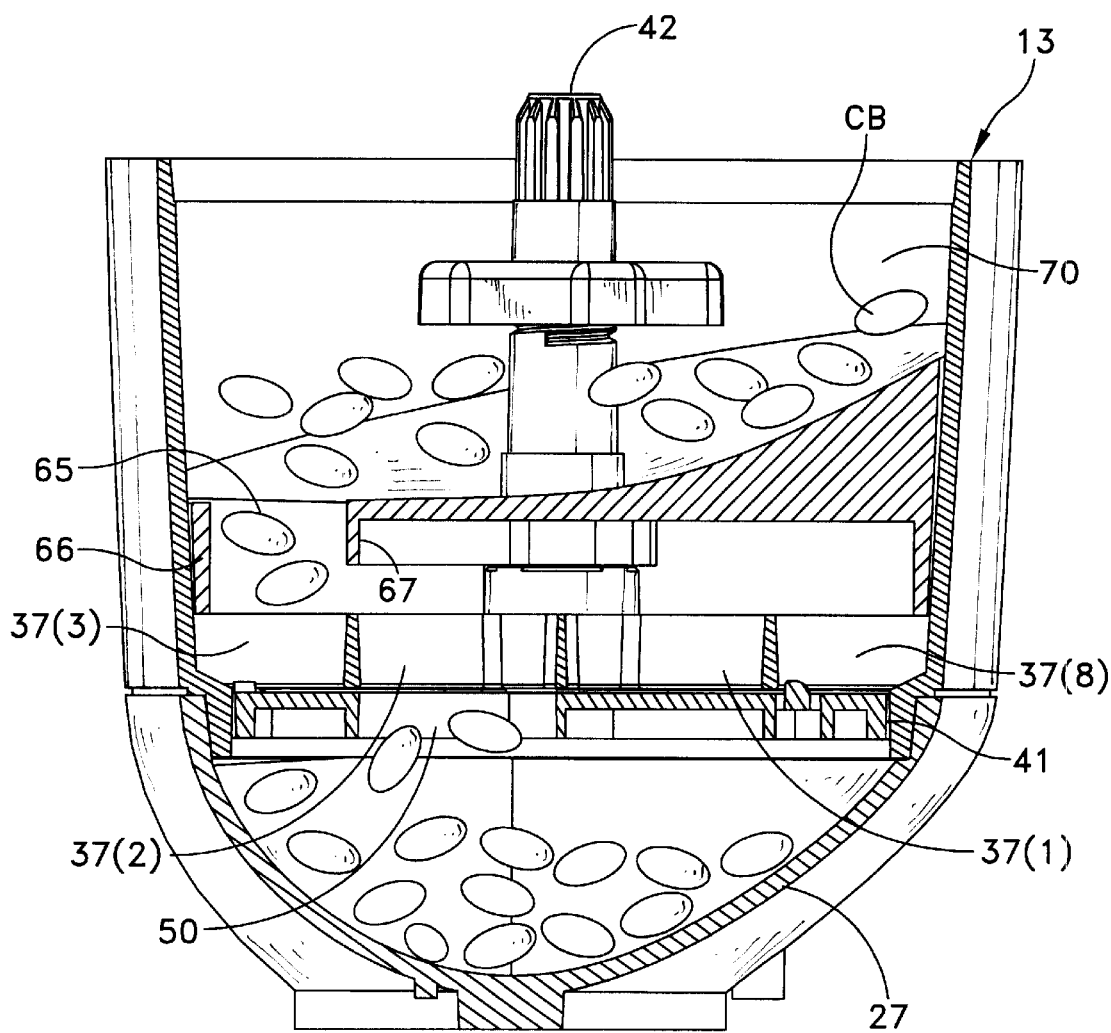

FIG. 6D depicts the result of a next rotation whereupon the open sector 65 moves over open sector 37(3) while the open sector 50 moves under open sector 37(2). In this position the sector 37(3) fills, while the sector 37(2) empties its contents into the hopper 27. After this rotation, the hopper 27 contains the appropriate volume of coffee beans to brew the desired number of cups of coffee.

As will now be apparent, the storage and dispensing element 13 has several advantages. First, the storage and dispensing element 13 can be readily removed from the burr grinder base 11 for remote storage or cleaning. It can be filled with coffee beans of a particular type and stored efficiently in any appropriate storage location. If the burr grinder 20 is supplied with additional storage and dispensing elements, they can be interchanged and store coffees of different types. The sloped plate 64 assures that the beans moves to a lowest point during rotation of the cover 14 to be directed to the open sector 65.

Figure 7:
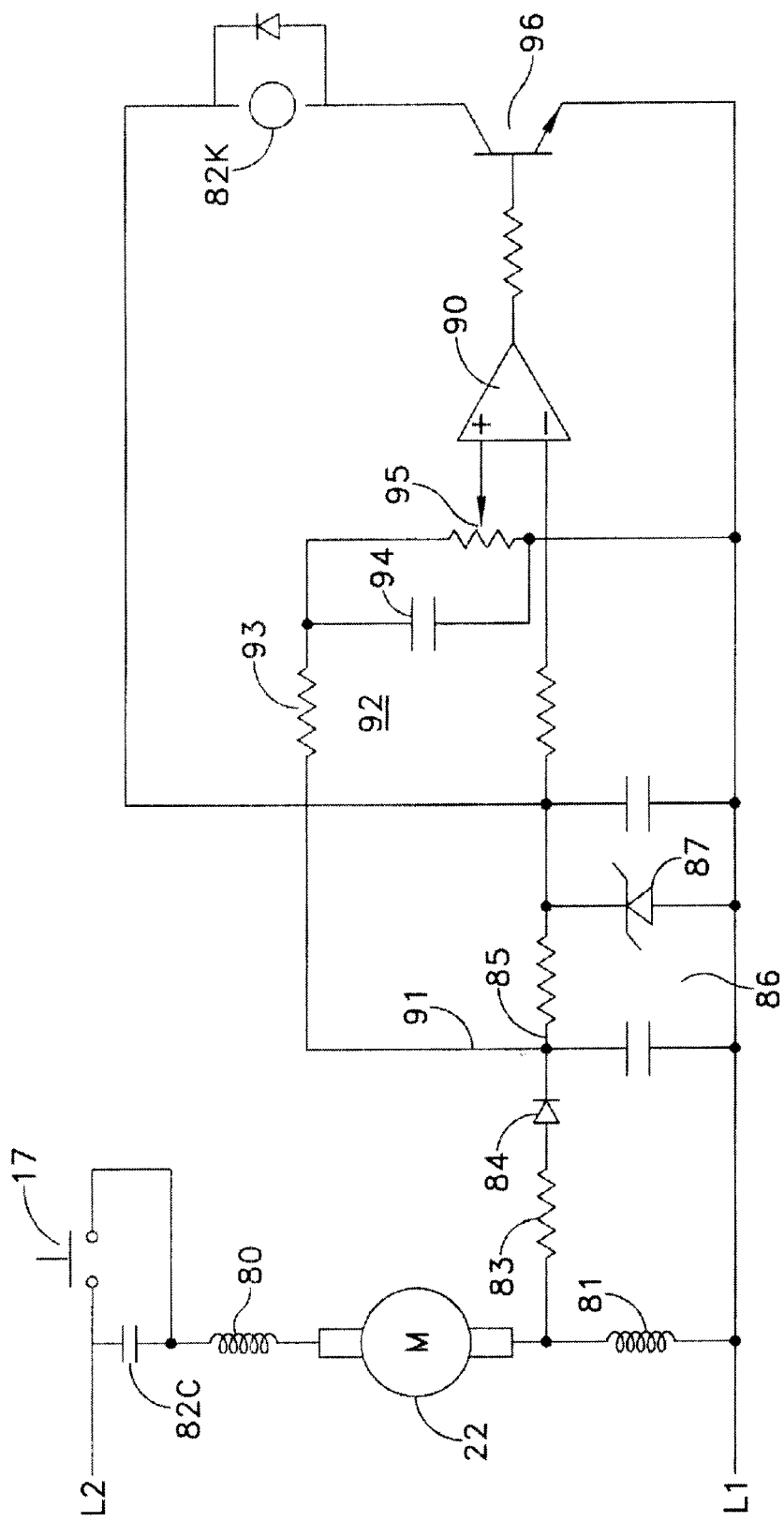
FIG. 7 is a schematic of a control circuit that can control the grinding mechanism in conjunction with this invention.

In addition and as previously indicated, the quantity of beans in the hopper 27 is premeasured by the action of the storage and dispensing element 13. Consequently, there is no need to time the grinding operation in order to meter the quantity of ground coffee. It is merely to continue the grinding operation until all the beans in the hopper 27 have been completely ground. FIG. 7 depicts a control circuit that can provide a "grind until complete" operation. Specifically, power from lines L1 and L2 is applied to the motor 22 through a split field winding including coils 80 and 81. The switch 17, which is a momentary on switch, initiates operation by connecting the motor 22 with its field coils 80 and 81 across line voltage.

A resistor 83 and diode 84 produce a half-wave, unfiltered rectified signal having a magnitude corresponding to the magnitude of the voltage across the field coil 81 that senses the load on the motor 22. This voltage increases with increasing load. The half-wave signal transfers to two paths.

The first path 85 includes a filter 86 and a reference voltage source, such as a Zener diode 87, to produce a reference voltage at one input of an operational amplifier 90 representing a predetermined or threshold load on the motor 22. A second path 91 couples the unregulated, load dependent, variable magnitude signal through a conditioning circuit 92 to the opposite input of the operational amplifier 90.

The conditioning circuit 92 includes a variable resistor 93 and a capacitor 94 that provide a delay and a calibration resistor 95. As will be apparent, the signal on the path 91 can be relatively noisy. The delay circuit prevents any spurious responses from shifting the output of the operational amplifier 90. It has been found, for example, that the resistor 93 and capacitor 94 can be selected to provide a one second time delay for results. Other time delays will also work. The variable resistor 95 establishes a threshold signal that will determine those voltages across the field coil 81 that represent a load condition and those that represent a no-load condition. The regulated voltage from the path 85 additionally is applied to the relay contact coil 82K in series with a switching transistor 96 controlled by the operational amplifier 90.

So long as the motor 22 is under load, as when the momentary switch 17 has been closed and during the actual grinding process, the voltage across the field coil 81 is sufficiently high to turn on the operational amplifier 90. The transistor 96 conducts and energizes the relay coil 82K thereby to close contacts 82C that parallel the momentaty-on switch 17 and latch the circuit to an on condition even after the momentary-on switch 17 is released. When the voltage across the field coil 81 reduces below a value corresponding to the threshold established by the variable resistor 95, the operational amplifier, that acts as a comparator, switches states and terminates conduction through the transistor 96. This releases the contacts 82C and the motor 22 turns off. Thus the grinding continues until all the coffee beans in the hopper 27 have been ground.

In accordance with this invention therefore, a storage and dispensing element 13 enables the achievement of all the objects and advantages of this invention. The construction of this element 13 allows storage of coffee beans without exposure to fresh air because the cover is close fitting and seals the top and because fresh air is blocked from flowing into the beans from the bottom by virtue of the offsets between the various open sectors in any detented position of the shaft 42. The storage and dispensing element is removable from the hopper 27 in the burr grinder. It can be physically stored remotely from the burr grinder in an ideal environment. This also enables the use of multiple storage and dispensing elements 13 for storing different types of coffee beans. Further, the grinding operation continues until all dispensed beans are ground. This means that the passages to and from the grinding mechanism remain relatively clean minimizing any adverse effects of introducing deteriorated coffee that is diminished in flavor. The device dispenses a constant volume of coffee beans at each position. For example, whenever the cover 14 moves through three positions the required quantity of coffee for brewing six cups is dispensed in a repeatable fashion. This overcomes any variations in the amount of coffee being ground that is dependent upon timers. The storage and dispensing element 13 is further constructed to be readily disassembled for cleaning further assuring coffee bean freshness during storage.

This invention has been disclosed in terms of a single embodiment with specific features. For example, eight open sectors have been shown. Other numbers of sectors could be substituted. There is a single sector offset between the sector openings through the distributor plate and the dispensing plate. Multiple sector offsets could also be used. A sloped distributor plate is disclosed for purposes of assuring the transfer of coffee beans through the open sector. Other slopes, or even a flat plate, could be substituted. It will be apparent that these and still other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A coffee grinder comprising:
   A) a coffee bean grinder including grinder heads and a motor for driving one of said grinder heads,
   B) a storage and dispensing element for premeasuring an appropriate volume of coffee beans for brewing a desired number of cups of coffee for transfer to said grinder,
   C) means for energizing said motor,
   D) a control for initiating operation of said motor grinder head including load sensing means attached to said motor for sensing the load level of said motor and means connected to said to load sensing means and said energizing means for maintaining the energization of said motor while the motor load is above a predetermined load level.

2. A coffee grinder as recited in claim 1 wherein said grinder motor is an electric motor with a field coil and said load sensing means connects to said field coil whereby the voltage across the field coil increases with an increasing load level.

3. A coffee grinder as recited in claim 2 wherein said energizing means includes a manually operated momentary-on switch and an electrical relay with a relay coil and normally open contacts in parallel with said switch and in series with said motor, actuation of said switch energizing said motor and said relay coil, said control maintaining said relay coil in an energized state so long as said motor exhibits load in excess of a predetermined value.

4. A coffee grinder as recited in claim 3 wherein said control circuit includes a comparator with a first input for receiving a reference voltage corresponding to a predetermined load on the motor that occurs when the coffee bean grinding has been completed, a second input for receiving the signal from said load sensing means and an output connected to said energizing means.

5. A coffee grinder as recited in claim 4 wherein said load sensing means includes a delay circuit and a calibration circuit.

6. A coffee grinder as recited in claim 5 wherein said delay circuit includes a capacitor.

7. A coffee grinder as recited in claim 5 wherein said calibration circuit includes a potentiometer.

8. In a coffee grinder including grinder heads and a motor and a storage and dispensing element for premeasuring a volume of coffee beans for brewing a desired number of cups of coffee for transfer to said grinder heads, a method for controlling the grinding of the coffee beams comprising the steps of:
   A) initiating the operation of the grinder motor,
   B) sensing the load level of said grinder motor, and
   C) continuing the operation of said grinder motor while the sensed motor load is above a predetermined level.

9. A method as recited in claim 8 wherein the grinder motor is an electric motor with a field coil, said sensing including measuring the voltage across the field coil.

10. A method as recited in claim 9 wherein said initiating the operation of the motor includes momentarily switching on the motor thereby to initially energize the motor and to enable a holding circuit to control the continued operation of the motor so long as said motor load in excess of a predetermined value.

11. A method as recited in claim 10 including comparing a reference voltage signal corresponding to a predetermined load on the motor that occurs when the coffee bean grinding has been completed and a signal representing the motor load.

12. A method as recited in claim 11 wherein said motor load signal is delayed and adjusted in magnitude.

13. A method as recited in claim 12 wherein said delay is obtained by processing the sensed signal in a capacitor.

14. A method as recited in claim 12 wherein said sensed signal is calibrated by a potentiometer.

* * * * *